US008503047B2

(12) United States Patent
Shirado

(10) Patent No.: US 8,503,047 B2
(45) Date of Patent: Aug. 6, 2013

(54) IMAGE READING DEVICE AND IMAGE FORMING APPARATUS, AND METHOD OF CONTROLLING IMAGE READING DEVICE

(75) Inventor: Hiroki Shirado, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 62 days.

(21) Appl. No.: 13/223,501

(22) Filed: Sep. 1, 2011

(65) Prior Publication Data

US 2012/0057211 A1    Mar. 8, 2012

(30) Foreign Application Priority Data

Sep. 1, 2010    (JP) .................................. 2010-195683

(51) Int. Cl.
*H04N 1/04*    (2006.01)
(52) U.S. Cl.
USPC ............................ 358/475; 358/509; 358/474
(58) Field of Classification Search
USPC ................. 358/474, 497, 496, 461, 486, 412, 358/406, 1.15, 475, 509
See application file for complete search history.

(56) References Cited

U.S. PATENT DOCUMENTS

| 5,206,501 A * | 4/1993 | Sakakibara et al. | 250/208.1 |
|---|---|---|---|
| 5,212,568 A * | 5/1993 | Graves et al. | 358/474 |
| 5,278,669 A * | 1/1994 | Takemoto | 358/453 |
| 5,600,445 A * | 2/1997 | Omi | 358/296 |
| 7,038,228 B2 * | 5/2006 | Hasegawa et al. | 250/556 |
| 7,432,492 B2 * | 10/2008 | Kikuchi | 250/208.1 |
| 7,446,909 B2 * | 11/2008 | Hashizume | 358/474 |
| 7,633,656 B2 * | 12/2009 | Miyahara | 358/474 |
| 7,659,532 B2 * | 2/2010 | Kikuchi | 250/566 |
| 7,777,918 B2 * | 8/2010 | Sekizawa et al. | 358/3.26 |
| 7,821,685 B2 * | 10/2010 | Yoshihisa | 358/497 |
| 7,929,806 B2 * | 4/2011 | Misaka | 382/299 |
| 7,944,589 B2 * | 5/2011 | Harada | 358/474 |
| 8,004,726 B2 * | 8/2011 | Misaka | 358/474 |
| 2007/0205355 A1 * | 9/2007 | Kikuchi | 250/208.1 |
| 2008/0180514 A1 * | 7/2008 | Sekizawa et al. | 347/252 |
| 2008/0187250 A1 * | 8/2008 | Misaka | 382/312 |

FOREIGN PATENT DOCUMENTS

| JP | 2002-94774 | 3/2002 |
|---|---|---|
| JP | 2002-111973 | 4/2002 |
| JP | 2003-234878 | 8/2003 |

* cited by examiner

*Primary Examiner* — Negussie Worku
(74) *Attorney, Agent, or Firm* — Oblon, Spivak, McClelland, Maier & Neustadt, L.L.P.

(57) ABSTRACT

A controller controls a scanner unit of an image reading device to read a section of an original document that corresponds to an image reading area specified by a user, when a user instruction for setting the image reading area is received. The controller causes the scanner unit to move to an image reading start position in a sub-scanning direction as specified by a user instruction. When a user instruction for starting image reading is received, the controller causes the scanner unit to start reading the section of the original document from the image reading start position.

20 Claims, 9 Drawing Sheets

IMAGE READING DEVICE AND IMAGE FORMING APPARATUS, AND METHOD OF CONTROLLING IMAGE READING DEVICE

CROSS-REFERENCE TO RELATED APPLICATIONS

This patent application is based on and claims priority under 35 U.S.C. §119 to Japanese Patent Application No. 2010-195683, filed on Sep. 1, 2010, in the Japan Patent Office, the entire disclosure of which is hereby incorporated herein by reference.

FIELD OF THE INVENTION

The present invention generally relates to an image reading device that reads an original document into image data and an image forming apparatus having the image reading device such as a scanner, copier, facsimile, and multifunctional apparatus, and a method of controlling the image reading device.

BACKGROUND

The recent image reading devices allow a user to set an image reading area such as by requesting the user to specify an image reading start position from which image reading is to be started and the lengths of an area to be read in the main scanning and sub-scanning directions. The image reading devices obtain image data of an area of an original document, which corresponds to the image reading area set by the user. The background image reading devices, however, start scanning the original document at its predetermined home position, mainly because the image reading devices need to read a reference whiteboard that is provided near the home position for further image processing. Since the background image reading devices start scanning the original document from the home position even when the image reading start position that is set by the user is away from the home position, it is not efficient in terms of productivity in image reading process.

In view of the above, Japanese Patent Application Publication No. 2003-234878 describes an image reading device, which changes a scan period in the main scanning direction according to the length of the image reading area in the main scanning direction. In case the image reading area set by the user is smaller than the maximum image reading area in length, the scan period in the main scanning direction is made shorter such that the scan speed in the sub-scanning direction increases, resulting in the increased productivity in image reading process. This image reading device, however, requires a complex structure, which tends to be costly, in order to interrupt reading operation in the main scanning direction.

Further, when the user sets up a specific image reading area through inputting various parameters to the image reading devices, the user may want to check beforehand whether the parameters input by the user actually reflects an image reading area of the original document that the user intends to select. Japanese Patent Application Publication No. 2002-111973 describes an image reading device, which allows the user to check the image reading area in both of the main and sub-scanning directions before scanning, by causing a light source to be partly turned on or off to indicate the image reading area specified by the user. In order to partly turn on or off the light source, the light source is implemented by an array of lighting elements. For this reasons, it requires a complex structure, which tends to be costly, to control on or off of each of the lighting elements according to the image reading area set by the user.

SUMMARY

In view of the above, there is a need for an image reading device capable of reading an image reading area of an original document as specified by a user instruction, without requiring a scanner unit to start scanning from its home position, thus improving throughput in image reading operation. Further, there is a need for an image reading device, which allows a user to easily check the image reading start position set by the user instruction before starting reading operation.

In addition to the above-described example embodiments, the present invention may be practiced in various other ways, for example, in the form of a method of controlling an image reading device or a recording medium storing a control program which causes a computer to perform the method of controlling an image reading device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
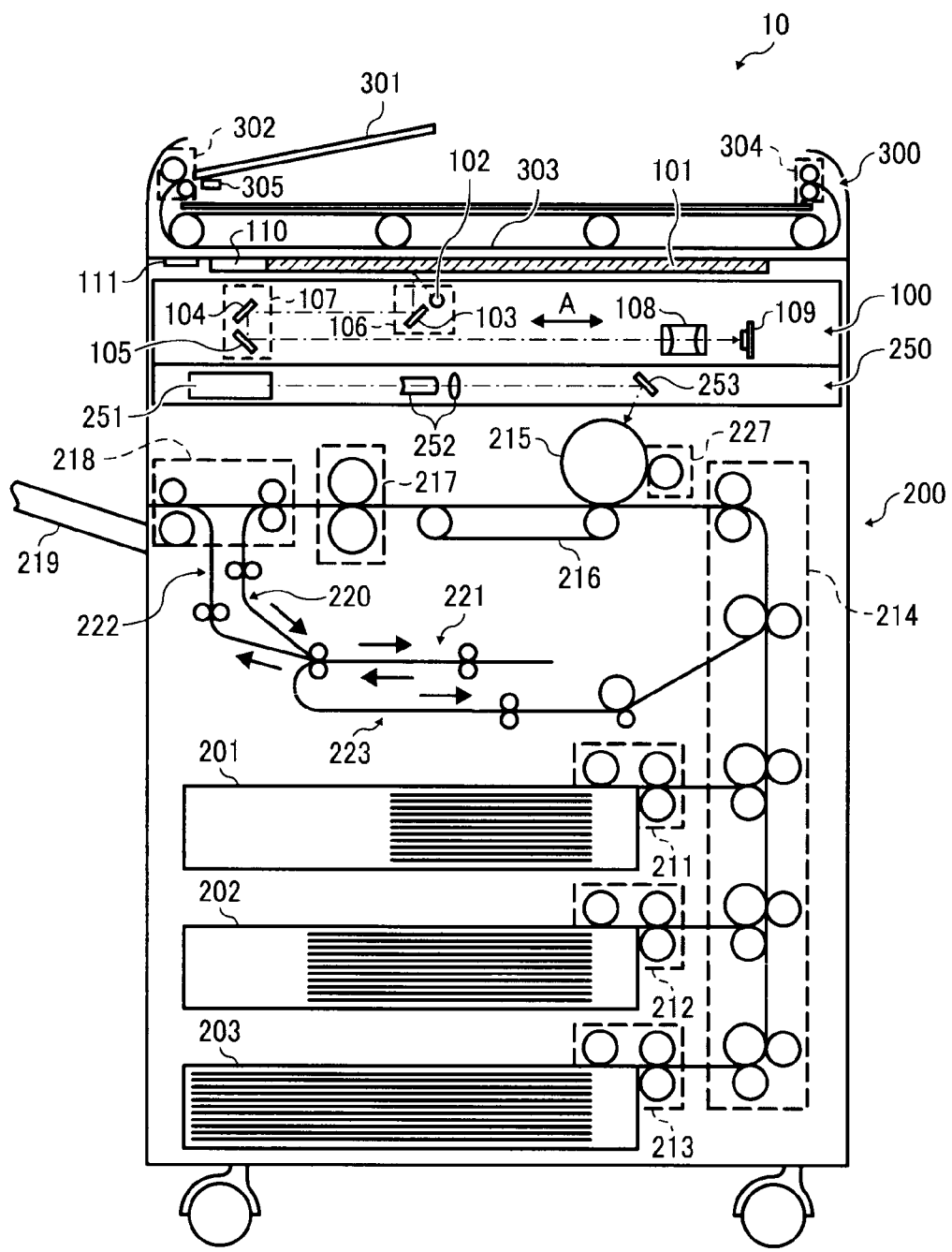
FIG. 1 is a cross-sectional view illustrating a structure of an image forming apparatus having an image reading device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIG. 1 is a cross-sectional view illustrating a structure of an image forming apparatus 10 having an image reading device 100 according to an example embodiment of the present invention.

As illustrated in FIG. 1, the image forming apparatus 10 is a digital copier having a body 200 on which the image reading device 100 and an automatic document feeder (ADF) 300 are mounted. Using the image reading device 100, an original document is read into image data.

In the image forming apparatus 10, the ADF 300 is provided above an exposure glass 101 of the image reading device 100 on which the original document to be read may be placed. The ADF 300 is attached to the body 200 by a hinge in a manner that the ADF 300 may be opened or closed with respect to the exposure glass 101. In this manner, the surface of the ADF 300 functions as a pressure plate, which presses against the original document being placed on the exposure glass 101. Alternatively, the ADF 300 may be replaced by the pressure plate, which covers the surface of the exposure glass 101 when it is closed.

Figure 4:
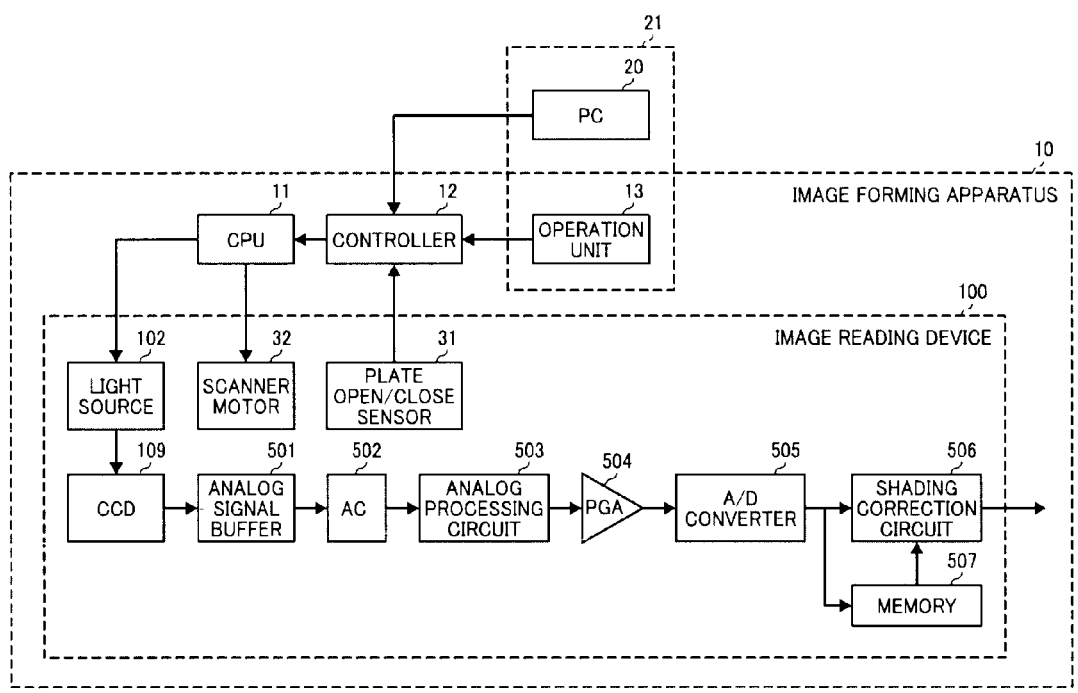
FIG. 4 is a schematic block diagram illustrating a structure of a control system and its peripheral circuit of the image forming apparatus of FIG. 1.

The ADF 300 includes a document tray 301, and a document feeder such as a document feed roller 302, a transfer belt 303, and a transfer roller 304. On the document tray 301, the original document, which may contain a plurality of pages or sheets, is placed. In this example, assuming that the original document is a single-sided copy, the original document is placed on the document tray 301 such that its side having an image thereon faces upward. When a "START" or "PRINT" (collectively referred to as "START") key on an operational unit 13 (FIG. 4) of the image forming apparatus 10 is selected, the document feed roller 302 automatically feeds the original document, one by one, from the document tray 301 to the exposure glass 101 through the transfer belt 303. After the original document is placed on the surface of the exposure glass 101, the image reading device 100 reads the original document. After being read by the image reading device 100, the original document is further transferred by the transfer belt 303 onto the top surface of the ADF 300. As described below, this operation performed by the ADF 300 is controlled by a control system (FIG. 4) of the image forming apparatus 10. Referring to FIG. 4, the control system of the image forming apparatus 10 includes a central processing unit (CPU) 11 and a controller 12.

Now, operation of transferring the original document to an image reading area on the exposure glass 101, performed by the control system, is explained according to an example embodiment of the present invention.

The ADF 300 is provided with a feed motor, which is driven according to control signals output from the control system. When the control system receives a feed start signal that is generated by the operation unit 13 as the "START" key of the operation unit 13 is pressed, the control system outputs a control signal that causes the feed motor to rotate in the forward direction. When the feed motor is rotated in the forward direction, the document feed roller 302 is rotated in the clockwise direction to cause a sheet of the original document that is placed at the top of the document stack to be transferred toward the exposure glass 101. When a document detection sensor 305 of the ADF 300 detects a leading edge of the original document sheet, the document detection sensor 305 outputs a detection signal to the control system. Based on this detection signal, the control system drives the feed motor to rotate in the reverse direction to prevent a sheet following the original document sheet from being fed toward the exposure glass 101. The original document sheet, which is separated from the following original document sheet, continues to be carried by the transfer belt 303, which is driven by a transfer belt motor.

When the document detection sensor 305 detects a trailing edge of the original document sheet and outputs a detection signal, the control system starts counting the rotational pulses of the transfer belt motor that drives the transfer belt 303 to obtain a counted rotational pulse value. When the counted rotational pulse value reaches a predetermined value, the control system stops driving the transfer belt 303 by controlling the transfer belt motor such that the original document sheet stays at the image reading area on the exposure glass 101. Further, when the document detection sensor 305 detects the trailing edge of the original document sheet, the control system drives the feed motor of the feed roller 302 again to cause the following original document sheet to be transferred toward the exposure glass 101. When the document detection sensor 305 detects the leading edge of the following original document sheet and when the control system determines that a counted pulse value of the feed motor from that time reaches a predetermined value, the control system stops driving the feed motor thus preventing the original document sheet to be transferred next from being fed.

The image reading device 100 reads the original document sheet, which is transferred to the image reading area on the exposure glass 101, into image data. When reading of the document sheet is completed, a signal indicating that the document is successfully read is input to the control system. Based on this signal, the control system drives the transfer belt motor to cause the transfer belt 303 to drive in the forward direction, thus transferring the document sheet from the exposure glass 101 toward the transfer roller 304.

As described above, as the "START" key is pressed, the stack of document sheets placed on the document tray 301 of the ADF 300 are automatically transferred, one by one, from the ADF 300 to the image reading area on the exposure glass 101. In this example, it is assumed that the document is placed on the document tray 301 such that its face having the image thereon faces up.

After the document sheet, which reaches the image reading area, is scanned and read by the image reading device 100, the document sheet is transferred by the transfer belt 303 onto the surface of the ADF 300 functioning as a discharge section. When there is any document sheet to be read next, the ADF 300 automatically feeds the document sheet toward the image reading area on the exposure glass 101.

Still referring to FIG. 1, the body 200 of the image forming apparatus 10 includes a plurality of sheet trays including a first tray 201, a second tray 202, and a third tray 203, each having a stack of transfer sheets, such as paper, therein. The transfer sheet is fed from any one of the first tray 201, the second tray 202, and the third tray 203, by corresponding one of a first sheet feed unit 211, a second sheet feed unit 212, and a third sheet feed unit 213, through a vertical transfer unit 214, toward a position at which a photoconductor 215 is disposed. In this example, the photoconductor 215 is implemented by a photoconductive drum. Further, in this example, any desired type of transfer sheet other than paper may be used.

The image reading device 100 further applies specific image processing to the image data of the original document, using an image processing circuit such as a shading correction circuit 506 (FIG. 4). The processed image data is then stored in a storage device such as a memory of the image forming apparatus 10. The body 200 includes an image forming device, which forms an image based on the processed image data. The image forming device at least includes a developing unit 227 and a charging unit. To form the image using the image forming device, the control system reads out the image data stored in the memory, and sends the image data to an image writing unit 250. The image writing unit 250 irradiates a laser light modulated based on the image data toward a surface of the photoconductor 215, which is previously charged by the charging unit, to form a latent image thereon. As the latent image passes the developing unit 227 with the rotation of the photoconductor 215, the latent image formed on the surface of the photoconductor 215 is developed into a toner image.

The body 200 further includes a transfer belt 216, which rotates at substantially the same rotational speed with that of the photoconductor 215. As the transfer belt 216 transfers the transfer sheet, which is transferred from selected one of the trays 201, 202, and 203, the toner image formed on the surface of the photoconductor 215 is transferred from the photoconductor 215 onto the transfer sheet. The transfer sheet having the toner image formed thereon is further transferred to a fixing unit 217 by the transfer belt 216 through which the toner image is fixed. The transfer sheet is further transferred through a discharge unit 218 to be output onto a discharge tray 219. In this example, it is assumed that the transfer sheet is discharged such that the face having the printed image thereon faces down. In order to reverse the side of the transfer sheet, the discharge unit 218 transfers the transfer sheet to a first switch back path 220 in which a reverse unit 221 is provided. At the reverse unit 221, the transfer sheet having the image faced up is reversed such that the image now faces down. The transfer sheet having the image faced down is transferred through a second switch back path 222 toward the discharge tray 219.

In case when the transfer sheet is to be formed with images on both sides of the transfer sheet, the transfer sheet having the image formed on one side is transferred by the discharge unit 218, through the first switch back path 220, to the reverse unit 221. At the reverse unit 221, the transfer sheet having its side reversed is further transferred to a duplex printing transfer unit 223. The duplex printing transfer unit 223 transfers the transfer sheet to the position where the photoconductor 215 is disposed, through the vertical transfer unit 214, to receive another image on the other side of the transfer sheet. The transfer sheet having the image formed on the other side is transferred through the fixing unit 217 for fixing operation, and further transferred to the discharge unit 218 for output onto the discharge tray 219.

The photoconductor 215, the transfer belt 216, the fixing unit 217, the discharge unit 218, and the developing unit 227 are driven by a main motor. The sheet feed units 211 to 213 are respectively connected to sheet feed clutches. Through the sheet feed clutches, the drive power from the main motor is transmitted to drive the sheet feed units 211 to 213. The vertical transfer unit 214, which is connected to an intermediate clutch, is driven as drive power from the main motor is transmitted through the intermediate clutch.

The image writing unit 250 mainly includes a laser output unit 251, imaging lenses 252, and mirrors 253. The laser output unit 251 is provided with a laser diode that functions as a light source to transmit laser light, a rotational deflector that irradiates the laser light such as a polygon mirror or an oscillating mirror. The laser light irradiated by the laser output unit 251 is deflected by the polygon mirror or the oscillating mirror toward the imaging lenses 252. The laser light is deflected by the mirrors 253 toward the surface of the photoconductor 215 to form an image thereon.

More specifically, the laser light that is deflected by the rotational deflector, such as the polygon mirror or the oscillating mirror, is scanned in the main scanning direction that is orthogonal to the rotational direction of the photoconductor 215 to write image data that is output from the image processing circuit of the image reading device 100 on the line basis. This scanning operation in the main scanning direction is repeated according to a predetermined cycle that is determined based on the rotational speed of the photoconductor 215 and scanning density, thus forming a latent image on the charged surface of the photoconductor 215.

In the above-described example, it is assumed that the image forming apparatus 10 feeds the original document using the ADF 300, reads the original document fed by the ADF 300 into image data using the image reading device 100, and prints an image based on the image data using the body (printer) 200, to complete printing operation. In another example, the image forming apparatus 10 may receive print data to be printed from the outside apparatus such as a PC 20 (FIG. 4), and prints an image based on the print data according to a user instruction received from the PC 20. In another example, the image forming apparatus 10 may read the original document into image data, and store the image data in a memory of the image forming apparatus 10 for later use. In another example, the image forming apparatus 10 may read the original document into image data, and send the image data to the outside apparatus such as the PC 20. Further, in case when the ADF 300 is replaced by the pressure plate, the original document is placed directly on the exposure glass by the user.

Figure 2:
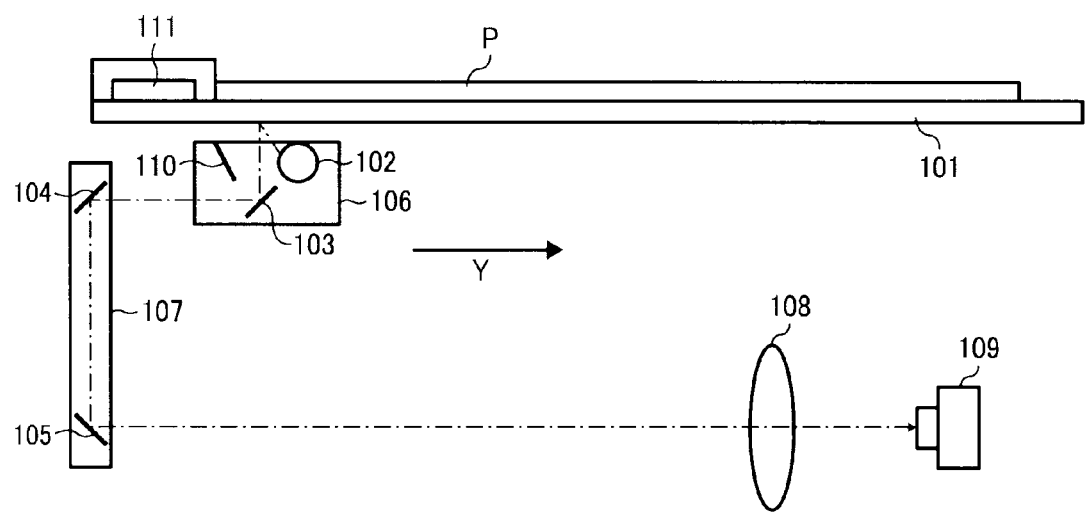
FIG. 2 is a schematic diagram illustrating a portion of the image reading device of FIG. 1.
Figure 3:
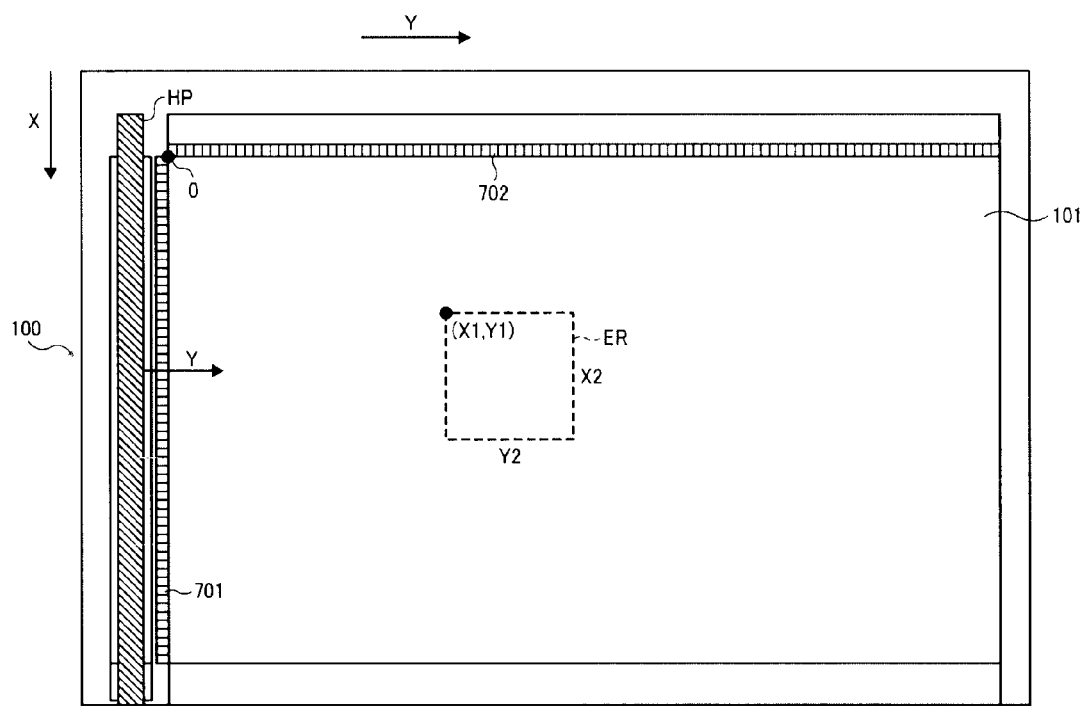
FIG. 3 is a plan view illustrating an image reading area on an exposure glass of the image reading device of FIG. 1, before the image reading area is set.

Referring now to FIGS. 1 to 3, a structure and operation of the image reading device 100 is explained in more detail. FIG. 2 illustrates a structure of the image reading device 100. FIG. 3 illustrates an image reading area on the exposure glass 101, before the image reading area is set by the user or when the default image reading area is used.

The image reading device 100 is a scanner device, which is mounted on the body 200 of the image forming apparatus 10 of FIG. 1. The image reading device 100 is provided with a light source drive section ("scanner unit") and an image processing section. The light source drive section, or the scanner unit, of the image reading device 100 scans light irradiated from a light source toward an object, in this case, the document placed on the exposure glass 101. The image processing section of the image reading device 100, which receives light reflected from the document, converts the reflected light into an electrical signal using a charged coupled device (CCD) functioning as a photo-electrical conversion element. The electrical signal is further converted by an analog-digital (A/D) converter of the image processing section from analog to digital to output image data of the original document.

As illustrated in FIGS. 1 and 2, the image reading device 100 includes the exposure glass 101 on which the document is placed, a first carriage 106 including a scanner light source ("light source") 102 that exposes the light to the document, a reflector 110, and a first reflective mirror 103, a second carriage 107 including a second reflective mirror 104 and a third reflective mirror 105, a CCD linear image sensor ("CCD") 109, a lens unit 108 that forms the image on the CCD 109, and a reference whiteboard 111. The reference whiteboard 111 may be used to correct optical distortion in the image. In replace of the CCD 109, any desired photo-electrical conversion element may be used such as CMOS. Further, as illustrated in FIG. 3, the image reading device 100 is provided with a X-direction scale 701 along the side edges of the exposure glass 101 having 0 positions in the sub-scanning ("Y") direction, and a Y-direction scale 702 along the side edges of the exposure glass 101 having 0 positions in the main scanning ("X") direction. In this example, as illustrated in FIG. 2, the whiteboard 111 is provided on a back surface of the X-direction scale 701.

The image reading device 100 scans the original document through its image surface to read the original document into image data, as follows.

The first carriage 106 and the second carriage 107 are originally positioned at a home position "HP" of FIG. 3. When scanning operation is started, a scanner motor 32 (FIG. 4), which may be a stepping motor, causes the first carriage 106 and the second carriage 107 to move in the sub-scanning "Y" direction with different speeds, but in a manner such that the optical length remains the same. In this example, the relative speed between the first carriage 106 and the second carriage 107 is 2:1. In this example, the scanner unit of the image reading device 100 corresponds to at least the first carriage 106 and the second carriage 107. However, depending on in which part the control system controls movement of the scanner unit, the scanner unit may only correspond to a portion of the first carriage 106 and the second carriage 107. For example, in case when the control system controls movement of the first carriage 106 based on the image reading area specified by the user, the scanner unit may only correspond to the first carriage 106, or a part of the first carriage 106.

At the same time, the light source 102 of the first carriage 106 irradiates the light toward the image surface of the original document ("P" in FIG. 2) placed on the exposure glass 101. The original document is placed on the exposure glass such that the image surface faces downward. The reflector 110 of the first carriage 106 reflects the light irradiated from the light source 102 toward the image surface of the original document P, while correcting profile of light level. The reflected light that is reflected from the image surface of the original document P passes the first reflective mirror 103 of the first carriage 106, the second reflective mirror 104 and the third reflective mirror 105 of the second carriage 107, and the lens unit 108 to form an image on the surface of the CCD 109. The CCD 109 converts the optical image into an analog electrical signal. The A/D converter circuit 505 (FIG. 4) further converts the electrical signal from analog to digital to output the digital electrical signal, which is the image data of the original document P.

In order to cause distribution of image data in the main scanning direction uniform, the image reading device 100 applies shading correction using data obtained from the whiteboard 111. In operation, the image reading device 100 obtains such data from the whiteboard 111 before scanning the image surface. More specifically, before starting reading of the original document into image data, the light source 102 irradiates the light toward the whiteboard 111 to output whiteboard data. Based on the whiteboard data, the image reading device 111 applies shading correction to the image data of the original document.

Figure 5:
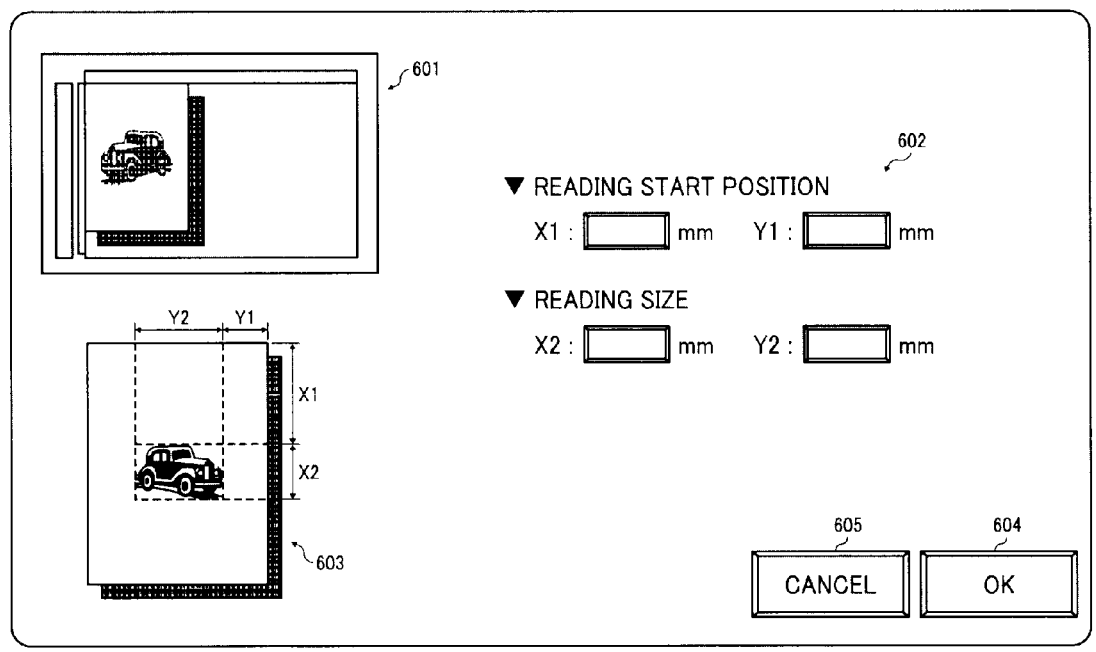
FIG. 5 is an example operational screen for setting an image reading area, which is displayed by the image forming apparatus of FIG. 1.

Referring now to FIGS. 4 and 5, a structure of the control system of the image forming apparatus 10 is explained according to an example embodiment of the present invention. FIG. 4 illustrates a structure of the control system of the image forming apparatus 10, together with its peripheral devices. FIG. 5 illustrates an example operational screen for allowing the user to set the image reading area, which may be displayed onto the operation unit 13 or a display of a PC 20 connected to the image forming apparatus 10.

As illustrated in FIG. 4, the image forming apparatus 10 includes the central processing unit ("CPU") 11, the controller 12, and the operation unit 13. The operation unit 13 includes an input device that inputs a user instruction regarding various settings, and a display device that displays various information to the user. For example, the operation unit 13 may be implemented by a touch-panel screen having the function of inputting and outputting information.

The PC 20 is connected to the image forming apparatus 10 such that they are communicable with each other. The PC 20 is implemented by a general-purpose computer such that it is provided with an input device such as a keyboard and mouse, a display device such as a liquid crystal display (LCD), a storage device such as a hard disk drive (HDD), and a communication device such as a network interface. The PC 20 may send various data such as print data that is generated according to a print description language (PDL) to the image forming apparatus 10. In this example, the operation unit 13 and the PC 20 each provide the function of setting an image reading area such that they may be referred to as a user interface 21. Through the operation unit 13 or the PC 20, the user may set the image reading area. More specifically, according to application program stored in a memory of the image forming apparatus 10, the control system of the image forming apparatus 10 causes the operational screen of FIG. 5 to be displayed onto the operation unit 13 or the display of the PC 20 to allow the user to input various parameters regarding the image reading area.

Referring to FIG. 5, the operational screen includes a reference position display section 601, an input section 602, an image reading area display section 603, an "OK" key 604, and a "CANCEL" key 605. The reference position display section 601 displays an image such as an illustration indicating the reference position of the image reading area. The input section 602 allows a user to input setting information such as an image reading start position X1 in the X direction and an image reading start position Y1 in the Y direction, and an image reading size X2 in the X direction and an image reading size Y2 in the Y direction. The image reading area display section 603 displays the positional relationship of an image reading area specified by setting information input through the input section 602 with respect to the reference position being displayed by the reference position display section 601. The "OK" key 604 is selected by the user when the user confirms information previously input by the user. The "CANCEL" key 605 is selected by the user when the user cancels information previously input by the user.

According to a user instruction received through the operational screen being displayed by the operation unit 13 or the display of the PC 20, the control system of the image forming apparatus 10 sets an image reading area. Specifically, the control system of the image forming apparatus 10 sets the image reading area based on the reference position "0" of the image reading area, the image reading start positions X1 and Y1, and the image reading area sizes X1 and Y2. The control system reads the original document placed on the exposure glass 101 into image data according to this image reading area specified by the image reading start position (X1, Y1) and the image reading area size (X2, Y2).

More specifically, the operation unit 13 or the display of the PC 20 displays the operational screen of FIG. 5 to allow the user to input various parameters including the image reading start position (X1, Y1), and the image reading size (X2, Y2).

Such setting information may be stored in the memory of the image forming apparatus 10. When the "START" key of the operation unit 13 is pressed, the control system of the image forming apparatus 10 reads the image reading area of the original document into image data. The image data output from the CCD 109 is sent to the image processing circuit such as the shading correction circuit 506. The processed image data is stored in the memory of the image forming apparatus 10 via the controller 12. The controller 12 may send the image data to the writing unit 250 to cause the writing unit 250 to form an image based on the image data, or send the image data to the PC 20.

The CPU 11 controls entire operation of the image forming apparatus 10 according to programs stored in its internal read only memory (ROM). For example, the CPU 11 may control either of the following operations (a) and (b), which will be described referring to FIG. 4.

(a) When the "START" key is pressed while the original document is being placed on the exposure glass 101 of FIG. 1, the CPU 11 controls operation of reading the original document by the image reading device 100, and operation of forming an image performed by the body (printer) 200. More specifically, to control image reading operation, the CPU 11 generates a light control signal to control on or off of the light source 102 of the image reading device 100. The CPU 11 further generates a motor control signal to drive the scanner motor 32, thus causing the first carriage 106 and the second carriage 107 to be moved in a desired direction with a desired speed.

(b) Assuming that the CPU 11 receives notification from the controller 12 that the ADF 300 is closed and the document is placed on the document tray 301 of the ADF 300, and when the "START" key is pressed, the CPU 11 controls operation of automatically feeding the document by the ADF 300, operation of reading the original document by the image reading device 100, and operation of forming an image by the body (printer) 200. The CPU 11 generates a light control signal to control on or off of the light source 102 of the image reading device 100 and generates a motor control signal to control the scanner motor 32 to cause the carriages 106 and 107 to be moved in a desired direction with a desired speed. The CPU 11 further causes the image reading device 100 to read the original document being transferred to the image reading area of the exposure glass 101. Alternatively, the CPU 11 may cause the image reading device 100 to read an original document placed on a document feeder reading glass, provided above the home position.

By performing either of the operations (a) and (b), the optical image of the original document is formed on the surface of the CCD 109. The CCD 109 converts the optical image into the analog electrical signal. The analog electrical signal, which is obtained by the CCD 109 through reading the original document, is input to an analog processing block through an analog signal buffer 501 and an AC combined circuit 502. The analog processing block includes an analog processing circuit 503, a programmable gain amplifier circuit (PGA) 504, the A/D converter circuit 505, etc. The analog processing circuit 503 applies line clamp processing and sample hold processing, to the analog signal. The PGA 504 applies gain processing. The A/D converter circuit 505 converts the signal from analog to digital to obtain image data of the original document.

The shading correction circuit 506 applies shading correction to the image data, using a specially designed image processing integrated circuit (image processing circuit). In applying shading correction, the shading correction circuit 506 uses data stored in a memory 507, which may be implemented by a nonvolatile memory such as a random access memory (RAM) or a flash ROM.

More specifically, in this example, the shading correction circuit 506 applies shading correction differently, depending on whether the image reading area set by default is used, or the image reading area set by the user is used.

When using the default image reading area, the shading correction circuit 506 applies shading correction using the following formula 1 to obtain the processed image data $S(n, m)$ to which shading correction is applied: $S(n, m) = \{D(n, m)-B\}/\{W(n)-B\}*ref$. In the formula 1, $D(n, m)$ denotes image data of an original document positioned at the n-th pixel in the main scanning direction and the m-th line in the sub-scanning direction. $W(n)$ denotes the reference whiteboard data obtained from the whiteboard 111 at the n-th pixel in the main scanning direction. B denotes the black offset data, which is previously obtained as an output level of the sensor IC of the CCD 109 when light is not entered. "ref" denotes a reference coefficient to be used for determining the output value of the processed image data $S(n, m)$. In alternative to applying shading correction using the formula 1, the offset data B may be subtracted from the level of the signal components obtained from the reflected light reflected from the image surface of the original document, at the time of reading the original document into the image data.

In case when the image reading area set by the user is used, the above-described technique of shading correction may not be efficient in term of productivity in image reading operation. Assuming that shading correction is to be applied using the formula 1, the image reading device 100 requires to read the whiteboard 111 to obtain the whiteboard data $W(n)$, before reading the image data $D(n,m)$. Assuming that the image reading area ER is set by the user as illustrated in FIG. 3, even when image reading is to be started at the position (X1, Y1), for each line of data, the carriages 106 and 107 start scanning from the home position HP to obtain the whiteboard data $W(n)$ from the whiteboard 111, which is provided at the back surface of the scale 701.

In view of the above, when the image reading area is set by the user, for example, using the operational screen of FIG. 5, the image reading device 100 applies shading correction using a formula different from the formula 1 such that the image reading device 100 does not have to start scanning from the home position near the position where the whiteboard 111 is provided before reading the image data at the image reading start position. This scanning operation will be described later.

The CPU 11 controls travel distances of the carriages 106 and 107, according to the image reading area set by the user through the operational screen displayed by the operation unit 13 or the PC 20, or document size information input by the document detection sensor 305. The CPU 11 controls a rotational speed of the scanner motor 32 according to the magnification ratio, which may be input by the user, to change the moving speeds of the carriages 106 and 107.

In this example, the controller 12 controls communication between the CPU 11 and the other device. For example, the controller 12 controls the following operations (c), (d), and (e).

(c) The controller 12 determines opening or closing of the ADF 300 with respect to the exposure glass 101 based on an output signal of the plate open/close sensor 31 to generate a determination result, and sends the determination result to the CPU 11.

(d) The controller 12 reads out the image data of the original document, which is stored in the memory after being processed, according to an instruction from the CPU 11. The controller 12 further sends the read image data to the writing unit 250 of FIG. 1 to cause the writing unit 250 to form an image, or sends the image data to the PC 20 at which the user operates.

(e) The controller 12 receives various data such as print data written in PDL from the outside apparatus such as the PC 20 connected to the image forming apparatus 10, converts the print data to image data (bit-map data) to deploy the image in a memory such as RAM. According to an instruction from the CPU 11, the controller 12 sends the image data to the writing unit 250 to cause the writing unit 250 to form an image based on the image data.

Figure 6:
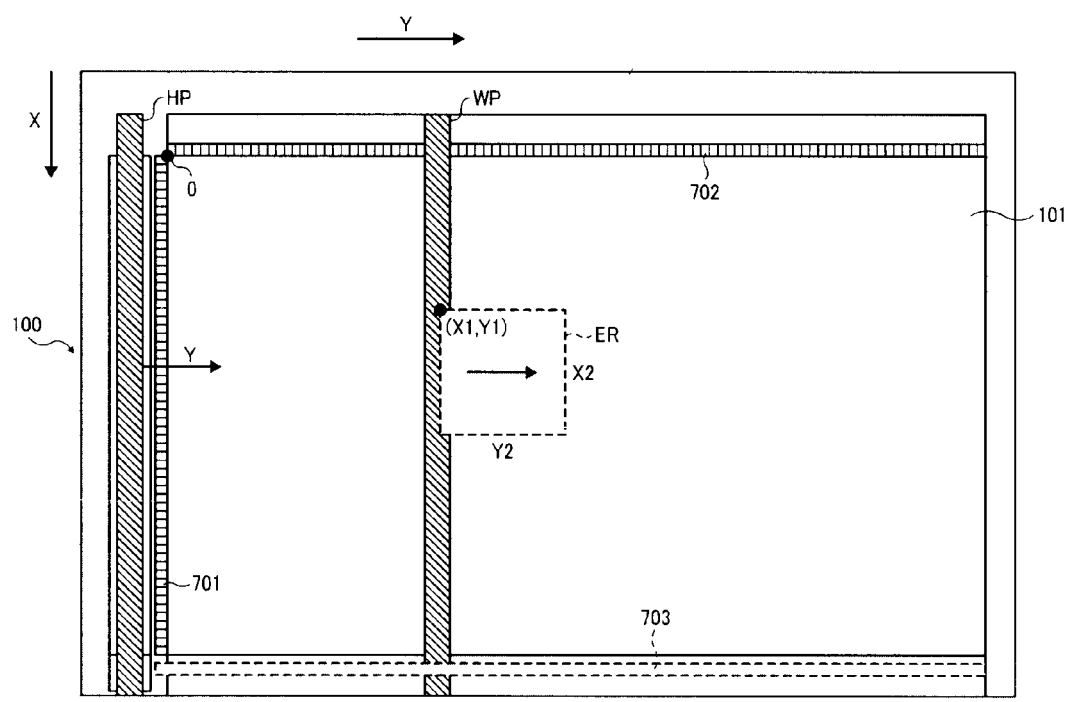
FIG. 6 is a plan view illustrating an image reading area on the exposure glass of the image reading device of FIG. 1, after the image reading area is set.
Figure 7:
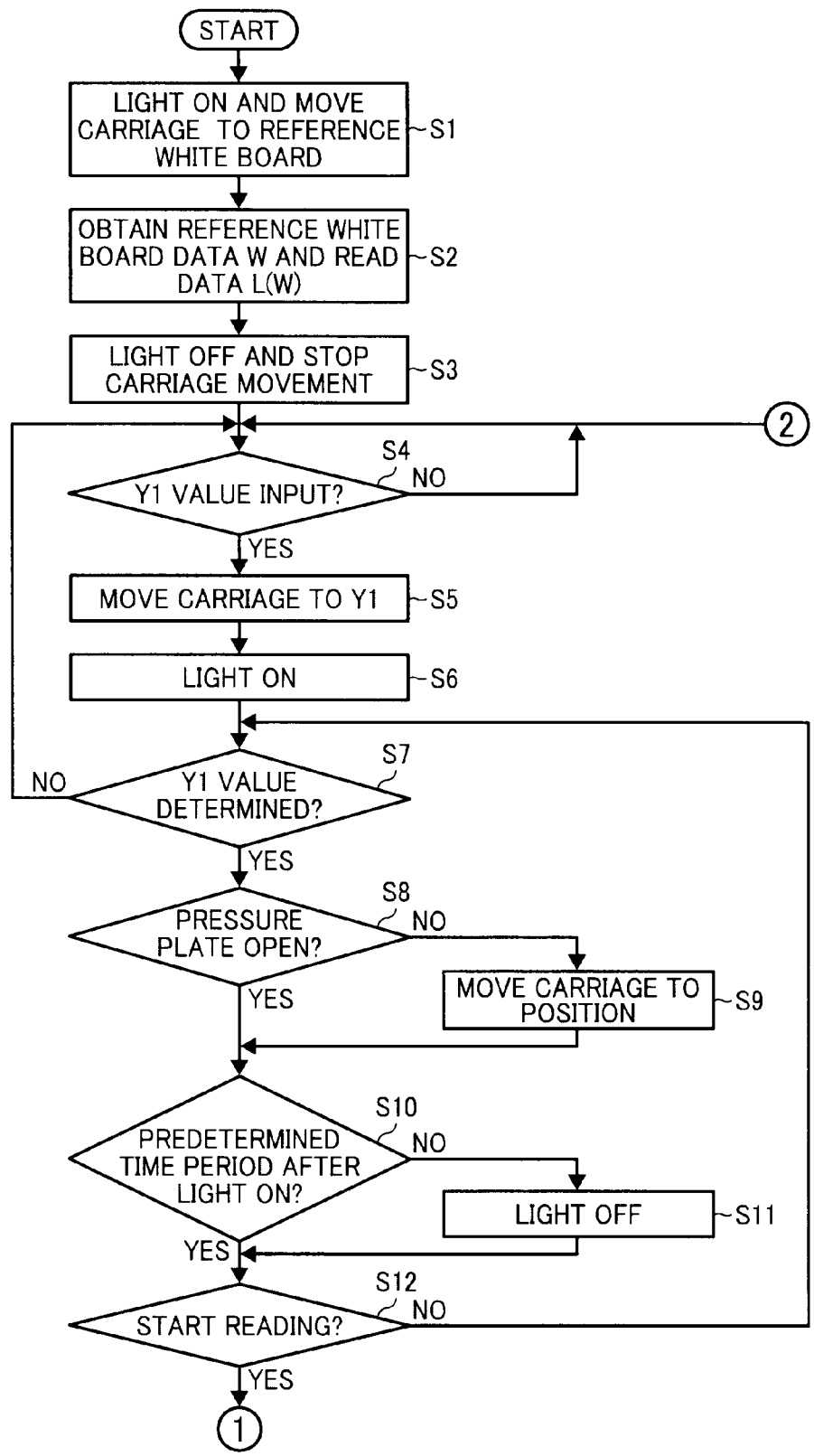
FIGS. 7 and 8 are a flowchart illustrating operation of setting an image reading area and reading the image reading area of an original document, performed by the control system of FIG. 4, according to an example embodiment of the present invention.
Figure 8:
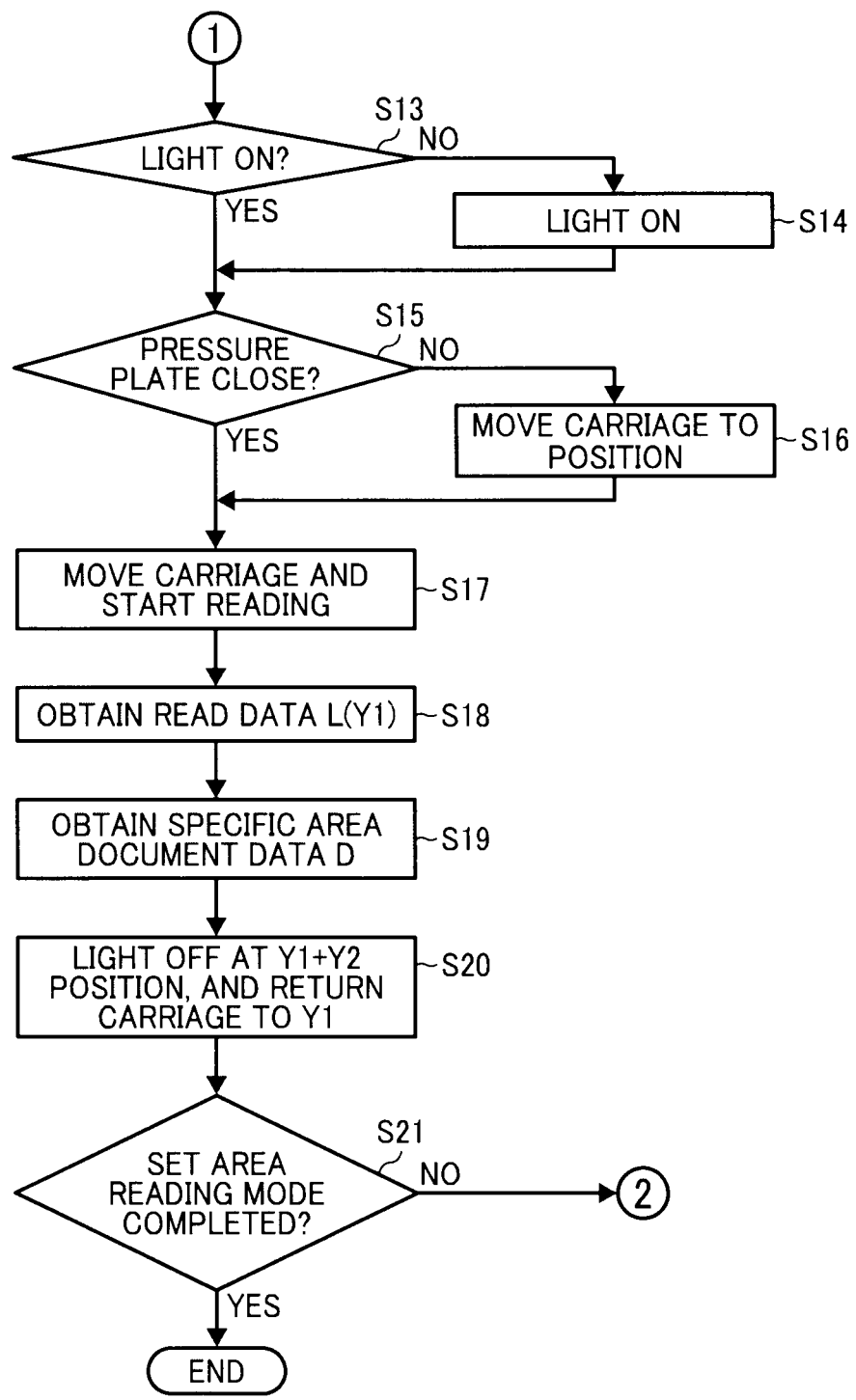

Referring now to FIGS. 6 to 8, operations of reading an original document into image data according to the image reading area set by the user, and applying shading correction to the read image data, are explained, according to an example embodiment of the present invention. The control system of the image forming apparatus 100 performs the following operations, according to a control program stored in the memory. The control program may be provided in any desired manner.

(1) According to a user instruction that requests the display of the operational screen for setting an image reading area, which may be input through the operation unit 13 or the PC 20, the CPU 11 of the image forming apparatus 10 changes its mode to a set area reading mode in which the image reading device 100 reads a set image reading area of the original document. The CPU 11 sets an image reading area according to the reference position of the image reading area, the image reading start position (X1, Y1), and the image reading size (X2, Y2), as specified by the user instruction. The CPU 11 causes the carriages 106 and 107, more specifically, the first reflective mirror 103 of the first carriage 106, to be moved in the sub-scanning direction Y to the image reading start position of the image reading area. When an instruction for starting image reading is received, the carriages 106 and 107 start reading the image reading area of the original document from the image reading start position.

(2) In set area reading mode, the CPU 11 obtains data ("reference whiteboard data W") from the reference whiteboard 11 provided near the home position, and light level data of the light source 102 when the light source 102 is positioned near the home position, before reading the original document.

(3) The CPU 11 causes the carriages 106 and 107 to be moved to the image reading position of the set image reading area at high speeds, which are set higher than the speeds that are set for the image reading operation.

(4) At the time when the carriages 106 and 107 are moved to the image reading start position of the image reading area, the CPU 11 causes the light source 102 to be turned on. Since the light source 102 is turned on, the user is able to easily check the image reading start position even when the original document being placed on the exposure glass 101 is large enough to cover the carriages 106 and 107 via the exposure glass 101.

(5) After the carriages 106 and 107 are moved to the image reading start position, and when the CPU 11 determines that there is no user instruction for starting image reading for a predetermined time, the CPU 11 causes the light source 102 to be turned off.

(6) When the CPU 11 determines that the image reading area is set through notification from the controller 12, and if the CPU 11 causes the carriages 106 and 107 to start image reading from the image reading start position Y1, the image will be read while the carriages 106 and 107 start accelerating to its desired scanning speeds. This may cause the image to be degraded as the scanning speeds are not kept constant at least for beginning. To prevent image degradation, the CPU 11 causes the carriages 106 and 107 to move, from the image reading start position, toward the home position by a distance that is previously set based on the distance needed for acceleration, before image reading begins. The time at which the carriages 106 and 107 are moved may be time right before image reading begins after the image reading area is set, time when the ADF 300 or the pressure plate is closed after the image reading area is set, or time when the "START" key is pressed regardless of whether the ADF 300 is opened after the image reading area is set.

(7) When the user instruction for starting image reading operation is received after the image reading area is set, the CPU 11 obtains the light level data of the light source 102 at the image reading start position.

(8) The CPU 11 compares the light level data of the light source 102 obtained near the home position, with the light level data obtained at the image reading start position, to obtain a difference. The CPU 11 further uses this difference to correct the image data of the original document.

In this example, as illustrated in FIG. 6, the light level data of the light source 102 is obtained by irradiating the light to a sheet metal section 703. The sheet metal section 703 is provided at the back surface of the side edge of the exposure glass 101 that extends in the sub-scanning direction. The CPU 11 of the image forming apparatus 10 monitors the change in light level of the light source 102 based on the light level data obtained from the surface of the sheet metal section 703. In case when the light level data cannot be obtained from the sheet metal section 703, for example, due to rust in the sheet metal section 703, the CPU 11 may obtain the light level data from a back surface of the Y-direction scale 702. For example, the Y-direction scale 702 may be provided with a reference whiteboard through out its surface in the sub-scanning direction.

Referring now to FIGS. 7 and 8, operation of controlling reading of an image reading area of an original document into image data, performed by the control system (FIG. 4) of the image forming apparatus 10, is explained according to an example embodiment of the present invention. When a user instruction for requesting the display of the operational screen of FIG. 5 is received through the operation unit 13 or the PC 20, the control system causes the image forming apparatus 10 to change its mode to a set area reading mode and perform the operation of FIGS. 7 and 8.

At S1 (FIG. 7), the CPU 11 outputs the "ON" light control signal to cause the light source 102 of the image reading device 100 to be turned on. The CPU 11 further outputs the "ON" motor control signal to the scanner motor 32 to move the carriages 106 and 107 from the home position HP of FIG. 3 to a section where reading of the reference whiteboard 111 is possible. More specifically, the carriage 107 is moved from the home position HP down to the reference whiteboard 111. In this manner, the light that is irradiated toward the reference whiteboard 111 from the light source 102 is reflected through the mirrors in the carriages to cause an optical image to be formed on the surface of the CCD 109. At the same time, the light is irradiated to a portion of the sheet metal section 703 in a vicinity of the whiteboard 111 to cause output of light level data of the sheet metal section 703.

At S2, the CPU 11 obtains reference whiteboard data W, by processing the light reflected from the surface of the reference whiteboard 111. The CPU 11 further obtains sheet metal data L(W), by processing the light reflected from the sheet metal section 703 at a portion where the reference whiteboard 111 is provided.

At S3, the CPU 11 outputs the "OFF" light control signal to the light source 102 to cause the light source 102 to be turned off, and the "OFF" motor control signal to stop moving the carriages 106 and 107.

At S4, the CPU 11 determines whether the Y1 value, which is input by the user through the operational screen for setting the image reading area, is received from the controller 12. The Y1 value specifies the image reading start position in the Y direction. When the CPU 11 determines that the Y1 value that specifies the image reading start position in the sub-scanning direction is received ("YES" at S4), the operation proceeds to S5. When the CPU 11 determines that the Y1 value is not received, the operation repeats S4.

At S5, the CPU 11 outputs the motor control signal to the scanner motor 32 to cause the carriages 106 and 107 to move to the image reading start position specified by the "Y1" value.

When the carriages 106 and 107 reach the position specified by the Y1 value, for example, at the waiting position "WP" of FIG. 6, the operation proceeds to S6 to cause the light source 102 to be lighted. With this light, the user is able to easily check the image reading start position at which the carriages 106 and 107 are now located.

At S7, the CPU 11 determines whether the Y1 value of the image reading area is set, that is, whether the Y1 value of the image reading area is determined to be the image reading start position by the user. For example, when the controller 12 sends notification that the "OK" key 604 of FIG. 5 is pressed by the user, the CPU 11 determines that the Y1 value is set. When the controller 12 sends notification that the "CANCEL" key 605 of FIG. 5 is pressed by the user, the CPU 11 determines that the Y1 value is not set. When it is determined that the Y1 value of the image reading area is set ("YES" at S7), the operation proceeds to S8. When it is determined that the Y1 value of the image reading area is not set ("NO" at S7), the operation returns to S4 to wait for a user input for the Y1 value.

For example, if the Y1 value is changed according to a user input, the CPU 11 causes the carriages 106 and 107 to move to a position specified by the value Y1. In order to cause the carriages 106 and 107 to move to the position right after the value Y1 is input, the CPU 11 controls the scanner motor 32 to move the carriages 106 and 107 with increased speeds. In order to allow the user to easily see the image reading start position, the light source 102 is kept turned on such that the light is irradiated toward the image surface of the original document. With this light, the user who sees from the top of the exposure glass 101 is able to easy check whether the image reading start position, at which the carriages 106 and 107 are currently located, is correctly set to read a specific area of the original document being placed on the exposure glass 101.

At S7, in addition to determining whether the Y1 value is set, the CPU 11 further determines whether any other positional information of the image reading area, such as the X1 value, the X2 value, and the Y2 value, is determined. Assuming that the positional information of the image reading area, such as the X1, Y1, X2, and Y2 values, is determined, the operation proceeds to S8. Further, when the positional information of the image reading area, i.e., X1, Y1, X2, and Y2, is set, the CPU 11 may store such information in the memory.

At S8, the CPU 11 checks opening or closing of the ADF 300, which functions as the pressure plate, through the controller 12. When the ADF 300 is opened with respect to the ADF 300, the operation proceeds to S10. When the ADF 300 is closed with respect to the ADF 300, and the plate open/close sensor 31 is turned on, the operation proceeds to S9.

At S9, the CPU 11 causes the carriages 106 and 107, which are respectively positioned at the image reading start position of the image reading area, to move away from the image reading area position for a distance that is necessary for accelerating the carriages 106 and 107 to reach the desired scanning speeds. The value of such distance is previously determined.

At S10, the CPU 11 determines whether the light source 102 has been lighted for a predetermined time period, for example, by referring to a counted timer value. When it is determined that the light source 102 has been lighted for the predetermined time period ("YES" at S10), the operation proceeds to S11.

At S11, the CPU 11 turns off the light control signal to cause the light source 102 to turn off, thus reducing electric current consumption as well as preventing the light source 102 from being degraded due to the increased usage.

At S12, the CPU 11 determines whether a user instruction for starting image reading is received. The user instruction for start image reading may be input by the user through pressing the "START" button on the operation unit 13. When it is determined that the user instruction is received ("YES") at S12, the operation proceeds to S13. When it is determined that the user instruction is not received ("NO") at S12, the operation returns to S7.

At S13 of FIG. 8, the CPU 11 checks whether the light source 102 is turned on or not. When it is determined that the light source 102 is not turned on ("NO" at S13), the operation proceeds to S14 to turn on the light source 102, and the operation proceeds to S15.

At S15, the CPU 11 checks whether the ADF 300, which functions as the pressure plate, is closed based on notification from the controller 12. When it is determined that the ADF 300 is closed ("YES" at S15), the operation proceeds to S17. When it is determined that the ADF 300 is open ("NO" at S15), the operation proceeds to S16.

At S16, the CPU 11 causes the carriages 106 and 107 to move away from the image reading start position toward the home position P for a distance that is needed for accelerating the carriages 106 and 107 to the desired scanning speeds, in a substantially similar manner as described above referring to S9.

At S17, the CPU 11 starts moving the carriages 106 and 107. When the carriages 106 and 107 move at substantially the same speeds, and the carriages 106 and 107 reach the image reading start position of the image reading area, that is, the "Y1" position, the CPU 11 starts reading the original document.

At S18, the CPU 11 obtains the sheet metal data L (Y1), by processing the light reflected from the sheet metal section 703 that is located at the sub-scanning position Y1, in a substantially similar manner as described above referring to S2.

At S19, the CPU 11 obtains image data D(n, m) of the original document that corresponds to the image reading area set by the user.

At S20, when the carriages 106 and 107 respectively move to the positions Y1+Y2, the CPU 11 causes the light source 102 to be turned off. Further, the CPU 11 causes the carriages 106 and 107 to be returned to the Y1 position. At this time, the CPU 11 uses the reference whiteboard data W and the sheet metal data L (W) that are obtained at S2 and the sheet metal data L (Y1) obtained at S18 to apply shading correction to the obtained image data D (n, m). Further, the CPU 11 may apply various other image processing.

At S21, the CPU 11 determines whether the set area reading mode is completed, for example, by checking whether a user instruction for changing the reading mode is received.

When it is determined that the set area reading mode is on ("NO" at S21), the operation returns to S4 of FIG. 7. When it is determined the set area reading mode is off ("YES" at S21), the operation ends.

As described above referring to S20, in the set area reading mode, the image forming apparatus 10 performs shading correction differently than the default mode in which default image reading area is used. The shading correction circuit 506 applies shading correction based on the sheet metal data L using the formula 2: $S(n, m)=[\{D(n, m)*L(W)/L(Y1)*1/f(Y1)\}-B]/[W(n)-B]*\text{ref}$.

The CPU 11 calculates the ratio of the sheet metal data L(W) obtained together with the reference whiteboard data W, with respect to the sheet metal data L(Y1) obtained through scanning, to obtain a coefficient L(W)/L(Y1). The image data D(n, m) of the original document, which is multiplied with the coefficient L(W)/L(Y1), is subjected for shading correction.

Figure 9:
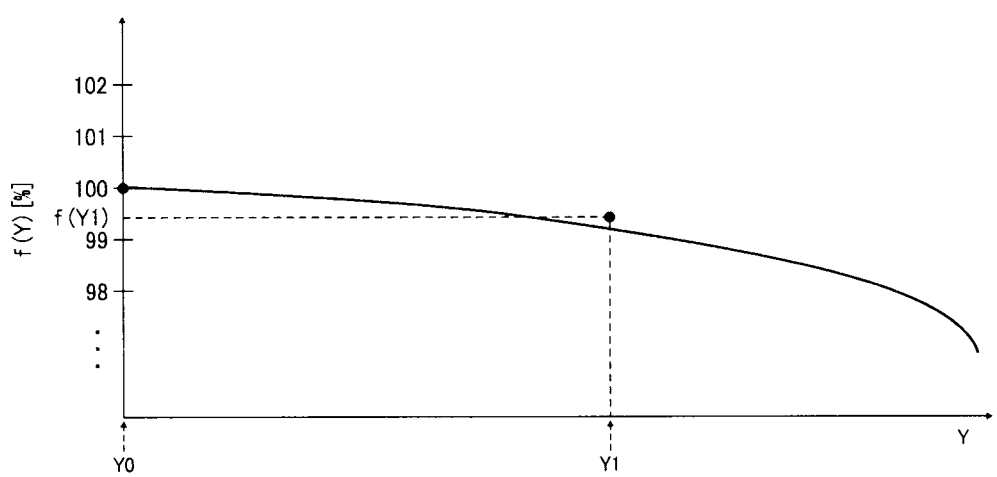
FIG. 9 is a graph illustrating the distribution of reference levels in the sub-scanning direction, obtained from a sheet metal section of the image reading device of FIG. 1.

In the formula 2, f(Y1) is a sheet metal density correction coefficient used for correcting the difference between the level of the sheet metal section 703 at the position W where the whiteboard 111 is provided and the level of the sheet metal section 703 at the image reading start position, which is caused due to variance in distribution of output levels of the sheet metal data L along the sub-scanning direction. For example, the sheet metal density correction coefficient f(Y1) may be obtained from distribution data of FIG. 9. The distribution data of FIG. 9, which shows the distribution of output levels of the sheet metal data L in the sub-scanning direction, may be previously obtained by scanning and stored in the memory 507 (FIG. 4). The horizontal axis of the graph of FIG. 9 indicates the sub-scanning position Y, and the vertical axis of the graph of FIG. 9 indicates the value of correction coefficient f(Y) expressed in percentage.

With this correction coefficient f(Y), which corrects the difference between the output level of the sheet metal data L(X) and the sheet metal data L(Y1), the negative influences that may be caused by obtaining the sheet metal data L at different sub-scanning positions can be suppressed. Accordingly, as long as the change in light level of the light source 102 can be monitored, image quality of the processed image data is kept high at least to the level that can be expected from the case in which the reference whiteboard W is obtained for each line data.

As described above, the image forming apparatus 10 has the following, but non-limiting, advantages.

According to a user instruction that requests the display of the operational screen, which may be input through the operation unit 13 or the PC 20, the image forming apparatus 10 changes its mode to a set area reading mode in which an image reading area of the original document is read as specified by the user. According to a user instruction for specifying the reference position of the image area, the image reading start position (X1, Y1) in the X and Y directions, and the image reading size (X2, Y2), the image forming apparatus 10 moves the carriages 106 and 107 to the image reading start position Y1 in the sub-scanning direction. When a user instruction for staring image reading is received, the image forming apparatus 10 causes the image reading device to start image reading from the image reading start position.

Since the image reading device can start reading the original document from the image reading start position, productivity in image reading is improved. Further, since the carriages of the image reading device are moved to the image reading start position as soon as such information is input by the user, the user is able to check whether the image reading start position is correctly set before starting scanning operation. In this manner, the user is prevented from inputting incorrect information even when the user is not familiar with in which direction the scanning direction X stands for.

When the image forming apparatus 10 is changed to the set area reading mode, the image forming apparatus 10 obtains the reference whiteboard data W from the white board 111, and the light level data of the light source 102. Using this information, the image forming apparatus 10 is able to calculate a correction value for correcting the change in image data in the image reading area with respect to the whiteboard data due to the change in light level of the light source 102.

When moving the carriages to the image reading start position, the image forming apparatus 10 causes the carriages to move at speeds faster than the normal scanning speeds. In this manner, as long as the user inputs setting information of the image reading area, the user can instantly check the image reading start position where the carriages are now located.

After the carriages are moved to the image reading start position, the light source 102 is caused to be lighted. As light is irradiated from the light source toward the image surface of the original document, the user can easily check whether the image reading start position is correctly set to reflect an image reading area of the original document.

When the CPU 11 determines that no user instruction for starting image reading is received for a predetermined time after the carriages are moved, the light source 102 is turned off. This reduces power consumption as well as suppresses damages to the light source 102.

Before starting image reading, the carriages are moved away from the image reading start position by a distance that is sufficient for accelerating the carriages to reach to the desired scanning speeds. In this manner, output image quality is kept high.

When a user instruction for starting image reading is received, the light level data of the light source 102 is obtained. Using this light level data, the image forming apparatus 10 is able to calculate a correction value used for correcting the change in image data in the set image reading area with respect to the reference whiteboard data due to the change in light level of the light source 102.

More specifically, the CPU 11 compares the light level data obtained at the time the whiteboard data is obtained with the light level data obtained at the time scanning is started to calculate a difference. The image data of the original document, which is multiplied with the difference, is subjected for shading correction. In this manner, the change in level of image data in the image reading area due to the change in light level of the light source 102 can be suppressed.

In the above-described example, the digital copier having the image reading device is described. Alternatively, any one of the above-described structure or method may be implemented to any other image forming apparatus such as a digital MFP provided with the image reading device, or an image reading device alone. Alternatively, the analog image forming apparatus such as the analog copier may be used. In case of using the analog image forming apparatus, the image reading device is not provided such that the image forming apparatus forms an image on the surface of the image carrier, based on the light reflected from the original document.

In one example, the control program for controlling image reading operation of the image reading device 100 may be installed in a memory of the image reading device 100. Upon execution, a processor of the image reading device 100 functions as the CPU 11 or the controller 12 of FIG. 4 to control operation of the light source 102 and the scanner motor 32, according to various data input through the user interface 21 and the plate open/close sensor 31. Further, in the above-described examples, it is assumed that the control system of the image forming apparatus 10 is implemented by the CPU 11 and the controller 12. Alternatively, any one of the functions of the control system may be distributed over more than one controller, which may be provided at the same or different locations.

As described above, the CPU 11 causes the carriages of the image reading device to move to an image reading start position as specified by a user instruction, thus allowing the user to easily check the image reading start position. Further, when a user instruction for starting image reading is received, the CPU 11 causes the carriages of the image reading device to read the original document from the image reading start position, thus improving throughput in image reading operation.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an image reading device, and a controller that controls the image reading device. The image reading device irradiates light irradiated from a light source to a surface of an original document placed on an exposure glass, deflects a reflected light reflected from the original document surface through a scanning system of a carriage to a photoelectrical conversion element, and converts an optical image formed on the photoelectrical conversion element to image data of the original document. The controller controls moving of the carriage as well as reading operation of the original document. When the controller sets an image reading area of the original document according to a user instruction, the controller moves the carriage to an image reading start position of the image reading area set by the user instruction, and when a user instruction for starting image reading is received, the controller causes the image reading device to read the original document from the image reading start position.

The image reading device is provided with a reference whiteboard used for shading correction, at a position different from the position on the exposure glass where the original document is placed. The controller causes the image reading device to read light reflected from the whiteboard to obtain whiteboard data. The controller applies shading correction to the image data of the original document based on the whiteboard data.

When an operation mode is changed to a set area reading mode, the controller causes the image reading device to read the reference whiteboard to obtain whiteboard data, and light level data of the light source.

When the carriage is moved to the image reading start position, the controller causes the carriage to move at a speed higher than the scanning speed for image reading operation.

After the carriage is moved to the image reading start position, the controller causes the light source to be lighted.

After the carriage is moved to the image reading start position, and when the controller determines that a user instruction for starting image reading is not received for a predetermined time period, the light source is turned off.

The image reading device is provided with a pressure plate that is opened or closed with respect to the exposure glass, and an open/close detector that detects opening or closing of the pressure plate. After the controller determines that the image reading area is set by the user, and when the controller determines that the pressure plate is closed with respect to the exposure glass based on a detection result of the open/close detector or when a user instruction for starting image reading is received while a detection result indicating that the pressure plate is open is received, the controller causes the carriage away from the image reading start position by a distance that is necessary for accelerating the carriage to reach to the desired scanning speed.

When a user instruction for starting image reading is received, the controller causes the image reading device to obtain light level data of the light source.

The controller compares the light level data that is obtained at the time when the reference whiteboard data is obtained, with the light level data that is obtained when image reading is started, to obtain a difference. The image data of the original document, which is multiplied by the difference, is subjected for shading correction.

In one example, the present invention may reside in: a recording medium storing a plurality of instructions which cause a computer to perform a method of controlling an image reading device having a scanner unit that reads an original document placed on a transparent board into image data. The method includes: changing a mode of the image reading device to a set area reading mode in which the scanner unit of the image reading device reads a section of the original document that corresponds to an image reading area specified by a user when a user instruction for setting the image reading area is received; determining whether a user instruction is received, which specifies an image reading start position in a sub-scanning direction from which the scanner unit starts reading; outputting a control signal to cause the scanner unit to move to the image reading start position specified by the user instruction and to stay at the image reading start position until a further user instruction is received; and outputting a control signal to cause the scanner unit to start reading the section of the original document from the image reading start position when a user instruction for starting image reading is received.

What is claimed is:

1. An image reading device, comprising:
a transparent board having a surface on which an original document is placed;
a scanner unit provided below the transparent board and to move in a main scanning direction and a sub-scanning direction to read the original document into image data, the scanner unit including:

a light source to irradiate light to the original document via the transparent board; and a deflector to deflect reflected light reflected from the original document to a photoelectrical conversion element, the conversion element converting the reflected light into the image data of the original document; and a controller to control the scanner unit to read a section of the original document that corresponds to an image reading area specified by a user when a user instruction for setting the image reading area is received, the controller is further configured to:

determine whether a user instruction is received, which specifies an image reading start position in the sub-scanning direction from which the scanner unit starts reading;

output a control signal to cause the scanner unit to move to the image reading start position specified by the user instruction and to stay at the image reading start position until a further user instruction is received; and output a control signal to cause the scanner unit to start reading the section of the original document from the image reading start position when a user instruction for starting image reading is received.

2. The image reading device of claim 1, further comprising:
a reference whiteboard disposed along a side edge of the transparent board that extends in the main scanning direction, wherein when the user instruction for setting the image reading area is received, the controller is further configured to:

cause the scanner unit to move to a reference sub-scanning position near the position where the whiteboard is disposed; and cause the scanner unit to obtain reference whiteboard data from the reference whiteboard, and reference light level data of the light source.

3. The image reading device of claim 2, further comprising:
a sheet metal section disposed along a side edge of the transparent board that extends in the sub-scanning direction, wherein the scanner unit obtains the reference light level data of the light source from a position of the sheet metal section that corresponds to the reference sub-scanning position near the position where the whiteboard is disposed.

4. The image reading device of claim 3, further comprising:
a shading correction circuit to apply shading correction to the image data of the original document obtained by the scanner unit, using the reference whiteboard data and the reference light level of the light source.

5. The image reading device of claim 4, wherein, when the user instruction for starting image reading is received, the controller causes the scanner unit staying at the image reading start position to obtain light level data of the light source from a position of the sheet metal section that corresponds to the image reading start position.

6. The image reading device of claim 5, wherein the shading correction circuit compares the reference light level of the light source with the light level data of the light source obtained at the image reading start position to generate a difference, and applies shading correction to a multiplied value obtained by multiplying the image data of the original document with the difference.

7. The image reading device of claim 6, further comprising:
a memory to store distribution data indicating distribution of light level data of the light source in the sub-scanning direction, wherein the correction circuit uses the distribution data to compensate the difference between the reference light level data of the light source and the light level data of the light source obtained at the image reading start position.

8. The image reading device of claim 1, wherein the controller further causes the scanner unit to move to the image reading start position at a speed higher than a scanning speed of the scanner unit previously set for image reading.

9. The image reading device of claim 8, wherein the controller further causes the light source to be turned on after the scanner unit is moved to the image reading start position.

10. The image reading device of claim 9, wherein the controller is further configured to:

determine whether a predetermined time period elapses after the scanner unit is moved to the image reading start position and the light source is turned on in response to the user instruction specifying the image reading start position; and cause the light source to be turned off when no user instruction is received after the predetermined time period elapses.

11. The image reading device of claim 10, wherein, at a predetermined time that is set before or equal to the time when the user instruction for starting image reading is received, the controller further moves the scanner unit away from the image reading start position by a distance that is required for the scanner unit to reach at the scanning speed previously set for image reading.

12. The image reading device of claim 11, wherein the predetermined time is selected from:

time when a detection signal indicating that a cover covering the transparent board is closed is output, after a user instruction for confirming the image reading area is received; and time when the user instruction for starting image reading is received when a detection signal indicating that the cover covering the transparent board is open is output, after the user instruction for confirming the image reading area is received.

13. An image forming apparatus, comprising:
an image reading device including:

a transparent board having a surface on which an original document is placed; and a scanner unit provided below the transparent board and to move in a main scanning direction and a sub-scanning direction to read the original document into image data, the scanner unit including: a light source to irradiate light to the original document via the transparent board; and a deflector to deflect reflected light reflected from the original document to a photoelectrical conversion element, the conversion element converting the reflected light into the image data of the original document;

a controller to control the scanner unit of the image reading device to read a section of the original document that corresponds to an image reading area specified by a user when a user instruction for setting the image reading area is received; and an image forming device to form an image on a recording sheet based on the image data of the original document, wherein the controller is further configured to:

determine whether a user instruction is received, which specifies an image reading start position in the sub-scanning direction from which the scanner unit starts reading;

output a control signal to cause the scanner unit to move to the image reading start position specified by the user instruction and to stay at the image reading start position until a further user instruction is received; and output a control signal to cause the scanner unit to start reading the section of the original document from the image reading start position when a user instruction for starting image reading is received.

14. The image forming apparatus of claim 13, further comprising:
an operation unit configured to display a screen to the user, which allows the user to input the user instruction for setting the image reading area.

15. The image forming apparatus of claim 13, further comprising:
a document feeder mounted on the image reading device and to automatically feed the original document onto the transparent board of the image reading device.

16. A method of controlling an image reading device having a scanner unit that reads an original document placed on a transparent board into image data, the method comprising:
changing a mode of the image reading device to a set area reading mode in which the scanner unit of the image reading device reads a section of the original document that corresponds to an image reading area specified by a user when a user instruction for setting the image reading area is received;
determining whether a user instruction is received, which specifies an image reading start position in a sub-scanning direction from which the scanner unit starts reading;
outputting a control signal to cause the scanner unit to move to the image reading start position specified by the user instruction and to stay at the image reading start position until a further user instruction is received; and
outputting a control signal to cause the scanner unit to start reading the section of the original document from the image reading start position when a user instruction for starting image reading is received.

17. The method of claim 16, further comprising:
causing the scanner unit to move to a reference sub-scanning position near a reference whiteboard is disposed when a user instruction for specifying an image reading start position in a sub-scanning direction is received, the whiteboard being disposed along a side edge of the transparent board that extends in a main scanning direction;
causing the scanner unit to read the reference whiteboard to obtain reference whiteboard data; and
causing the scanner unit to obtain reference light level data of a light source of the scanner unit; and
applying shading correction to the image data of the original document obtained by the scanner unit, using the reference whiteboard data and the reference light level of the light source.

18. The method of claim 17, further comprising:
causing the scanner unit staying at the image reading start position to obtain light level data of the light source when the user instruction for starting image reading is received;
comparing the reference light level of the light source with the light level data of the light source obtained at the image reading start position to generate a difference; and
applying shading correction to a multiplied value obtained by multiplying the image data of the original document with the difference.

19. The method of claim 18, further comprising:
causing the light source to be turned on after the scanner unit is moved to the image reading start position;
determining whether a predetermined time period elapses after the scanner unit is moved to the image reading start position and the light source is turned on in response to the user instruction specifying the image reading start position; and
causing the light source to be turned off when no user instruction is received after the predetermined time period elapses.

20. The method of claim 19, further comprising:
moving the scanner unit away from the image reading start position by a distance that is required for the scanner unit to reach at a scanning speed previously set for image reading, at a predetermined time that is set before or equal to the time when the user instruction for starting image reading is received.

* * * * *